United States Patent [19]
Garcia-Mallol

[11] Patent Number: 5,333,838
[45] Date of Patent: Aug. 2, 1994

[54] BLADE DAMPER WITH EXTENSIONS TO REDUCE BOUNDARY LEAKAGE

[75] Inventor: Juan A. Garcia-Mallol, Morristown, N.J.

[73] Assignee: Foster Wheeler Energy Corporation, Clinton, N.J.

[21] Appl. No.: 943,619

[22] Filed: Sep. 11, 1992

[51] Int. Cl.$^5$ ............................................. F16K 1/22
[52] U.S. Cl. ................................. 251/305; 137/875; 110/263
[58] Field of Search .................. 251/305; 137/875; 110/188, 189, 190, 263

[56] References Cited

U.S. PATENT DOCUMENTS

| | | |
|---|---|---|
| 385,135 | 6/1888 | Rathbone . |
| 1,891,768 | 12/1932 | Kishline ........................... 251/305 |
| 2,092,246 | 9/1937 | Firth ................................. 123/545 |
| 2,095,263 | 10/1937 | Moss . |
| 3,286,732 | 11/1966 | Alley ................................. 137/601 |
| 3,894,481 | 7/1975 | Alley . |
| 4,095,534 | 6/1978 | Goidich ............................. 110/263 |
| 4,766,807 | 8/1988 | Davis ................................. 137/601 |
| 4,955,296 | 9/1990 | Barlow ............................... 137/601 |

*Primary Examiner*—Albert W. Davis, Jr.
*Attorney, Agent, or Firm*—Marvin A. Naigur

[57] ABSTRACT

A blade damper for use in fluid flow control devices having damper blades mounted on an axle and having extension ears mounted at opposite ends of the damper blades. The extension ears are mounted in a 90 degree relationship to the damper blades and are semi-circular at their boundary to allow for rotation with the damper blades. The extension ears prevent fluid leakage through boundary planes perpendicular to the axle when the damper is open thereby providing near linear side blade opening versus fluid flow characteristics.

5 Claims, 1 Drawing Sheet

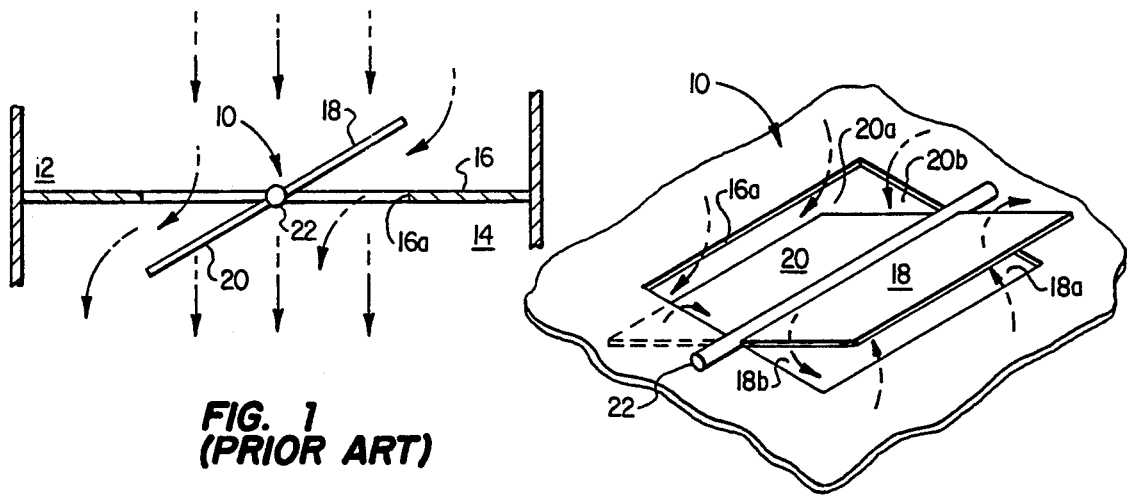
FIG. 1 (PRIOR ART)
FIG. 2 (PRIOR ART)
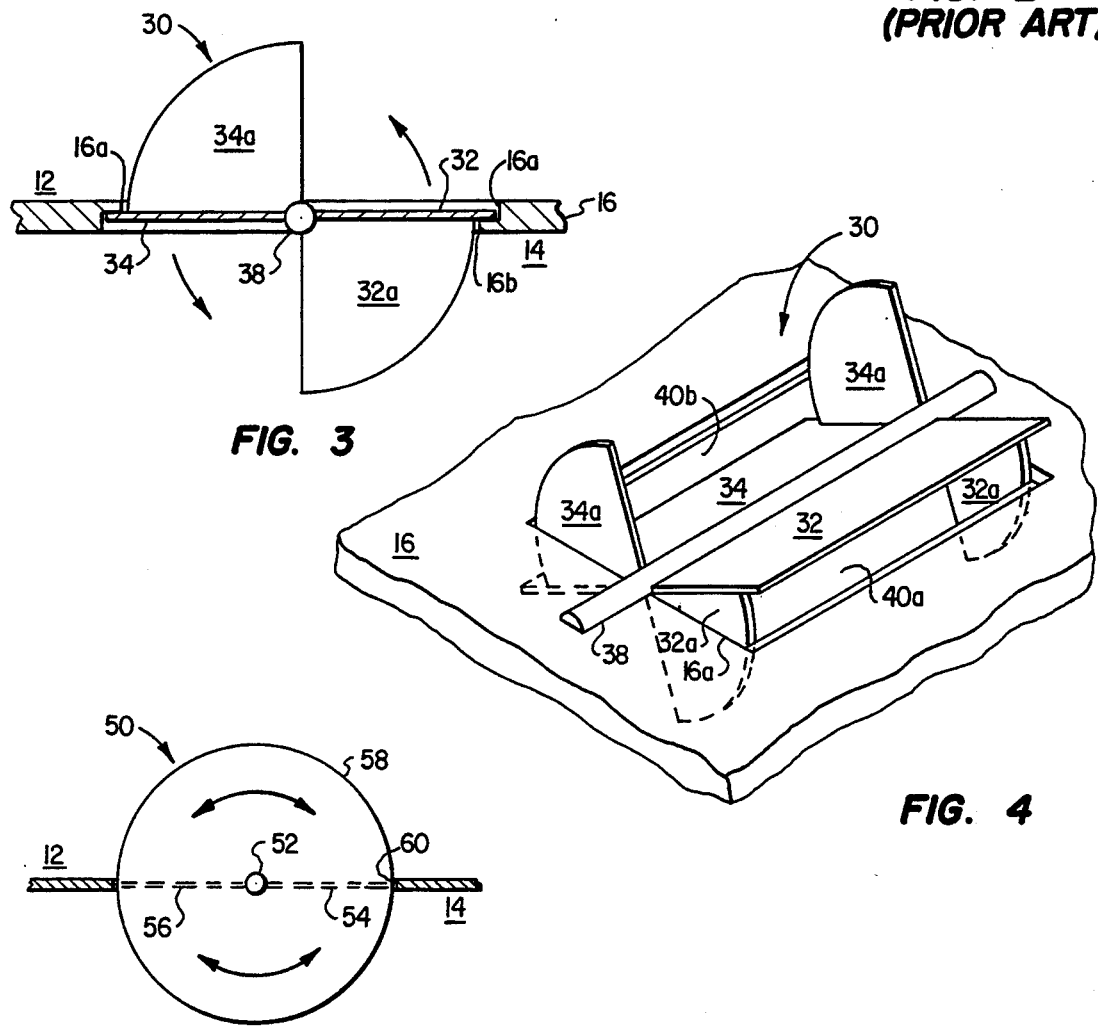
FIG. 3
FIG. 4
FIG. 5

BLADE DAMPER WITH EXTENSIONS TO REDUCE BOUNDARY LEAKAGE

FIELD OF THE INVENTION

This invention relates in general to a fluid flow control device and, more specifically, to a blade damper which prevents fluid leakage through boundary planes perpendicular to the axle when the damper is open.

BACKGROUND OF THE INVENTION

A blade damper is essentially a valve or plate that is positioned over an orifice and is used to regulate the flow of air, gas or liquids ("fluids") through the orifice. The blade damper is generally mounted on an axle for rotation within the orifice, with the axle mounted relative to the orifice. One such use of a blade damper occurs within a heat exchanger having a combustor containing a fluidized bed wherein one or more dampers are placed within the heat exchanger to control the flow of air to the fluidized bed.

In general the flow of fluid through an orifice is determined by the pressure differential across the orifice and by the surface area of the orifice. Ideally, when a damper is closed it should not allow any fluid to flow through the orifice; when it is fully open it should not restrict the flow of fluid through the orifice; and, when it is partially open, it should allow fluid to flow through the orifice relative to the percentage opening of the damper. With proper control of pressure, the flow of fluid through the orifice is approximately proportional to the opening of the damper. However, this linear relationship between the flow of fluid through the orifice and the damper opening is often impossible to obtain due leakage of fluid through the damper boundary planes perpendicular to the axle.

Several techniques are known in the prior art for preventing leakage of fluid through an orifice sealed by a blade damper when the damper is closed. For example, the blades of the damper are overlapped with the edge of the orifice, or sealing strips are provided at the edge of the blade. Other techniques are employed to allow for maximum fluid flow through an orifice when the damper blade is fully open. However, none of these techniques have addressed the problem of controlling fluid leakage through boundary planes perpendicular to the axle when the blade damper is partially open.

SUMMARY OF THE INVENTION

It is therefore an object of the invention to provide a blade damper for regulating the flow of a fluid through an orifice.

It is a further object of the invention to eliminate leakage of fluid over particular boundary planes when the blade damper is open.

It is still a further object of the invention to improve the control of fluid flow through an orifice over a wide range of damper blade openings.

Yet another object of the invention is to provide an improved blade damper whose damper opening versus fluid flow characteristics are substantially linear.

A further object of the invention is to provide a blade damper for rotation in a single direction to prevent fluid leakage through boundary planes perpendicular to the axle of the blade damper when the damper is open.

A still further object of the present invention is to provide a blade damper for rotation in two directions and having circular extension ears at each end of the damper to prevent leakage through boundary planes perpendicular to the axle when the damper is open.

Another object of the present invention is to provide a heat exchange in combination with a blade damper to control the flow of air to a combustor.

Toward the fulfillment of these and other objects, an apparatus for controlling the flow of fluid through an orifice between two regions according to the present invention is provided which includes a damper blade, means mounting the damper blade for pivotal movement relative to the orifice, to open and close the orifice, and means extending from the damper blade to control fluid flow through the orifice.

In addition, a blade damper for controlling fluid flow through an orifice between two regions is provided which includes an axle mounted relative to the orifice, damper blades pivotally mounted on the axle, and extension ears mounted on the damper blades and in a 90 degree relationship to the damper blades, to prevent the flow of fluid over the end boundaries of the damper blades and through the orifice. The extension ears act to prevent leakage of fluid around the boundary plane of the damper blades perpendicular to the axle as the damper blades are rotated about the axis of the axle. The extension ears of the present invention provide a simple, effective and inexpensive solution to the problem of blade damper leakage through its boundary planes perpendicular to the axle.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings wherein:

FIG. i is a cross section of a blade damper of the prior art;

FIG. 2 is a perspective view of the prior art damper shown in FIG. 1 illustrating the problem of fluid flow through the boundary planes perpendicular to the axle of the damper;

FIG. 3 is a cross-section view of one embodiment of the blade damper according to the present invention;

FIG. 4 is a perspective view of the blade damper of FIG. 3; and

FIG. 5 is a cross-section view of an alternative embodiment of the blade damper according to the present invention.

DETAILED DESCRIPTION OF THE INVENTION

Referring specifically to FIG. 1, the reference numeral 10 refers to a blade damper mounted between two regions 12 and 14 separated by a partition, or wall, 16. The wall 16 separating the regions 12 and 14 operates to prevent fluid from flowing out of one of the regions and into the other. An opening 16a is provided through the wall 16 and provides a portal through which fluids may flow from one of the regions to the other. The flow of fluid between the two regions 12 and 14 is shown in FIGS. 1 and 2 as dashed arrows.

The damper 10 consists of two damper blades 18 and 20 mounted on diametrically opposed surfaces of an axle 22. It is understood that the axle 22 is rotatably mounted to the wall 16 and relative to the orifice 16a in any conventional manner. The damper 10 is positioned within the orifice 16a and can be closed, partially opened, or fully opened to control the fluid flow through the orifice 16a. Dampers of the type shown in FIG. 1 are well known in the art.

The blade damper 10 is shown partially open in FIG. 2, thereby allowing fluids to flow through the orifice 16a. In this position of the damper 10, fluids pass through the opening 16a along two boundary planes 18a and 20a defined between the leading edges of the blades 18 and 20, respectively, and the corresponding surfaces of the wall 16 defining the opening 16a and extending parallel to the axle 22. The fluids also pass along two additional boundary planes 18b defined between the end edges of the blade 18 and the corresponding surfaces of the wall 16 defining the opening 16a and two additional boundary planes 20b defined between the end edges of the blade 20 and the corresponding surfaces of the wall 16 defining the opening 16a. The boundary planes 18b and 20b extend perpendicular to the axle 22, and the majority of the fluid flows through the boundary planes 18a and 20a with a minority flowing through the boundary planes 18b and 10b. The flow of fluids through the boundary plans 18b and 20b when the damper is open creates non-linear and undesirable damper opening versus flow rate characteristics.

Now referring to FIG. 3 of the drawings, a blade damper 30 according to an embodiment of the present invention is shown mounted relative to the wall 16 for movement relative to the orifice 16a between the two regions 12 and 14 as in the prior art arrangement of FIGS. 1 and 2. The blade damper 30 includes damper blades 32 and 34 mounted on opposite sides of an axle 38 which is rotatably mounted to the wall 16 in a manner to be explained. A pair of extension ears 32a are mounted at the respective ends of the damper blade 32, and a pair of extension ears 34a mounted at the respective ends of the damper blade 34. The extension ears 32a and 34a extend perpendicular to their respective damper blades 32 and 34 and extend from opposite surfaces of the damper blades.

Notches 16b and 16c are provided in opposite position in the wall 16 defining the orifice 16a to allow the damper blades 32 and 34 to be positioned flush against the wall 16 thereby sealing the orifice 16a and preventing fluids from flowing through the orifice when the damper is closed. When it is desired that some portion of fluid flow between the regions 12 and 14, the damper blades 32 and 34 are rotated away from the flush position against the wall 16, in a manner described below.

The axle 38 is secured to the wall 16 in a manner to allow the axle 38 to rotate about its axis and relative to the orifice. The securing means may comprise sleeves at opposite ends of the orifice 16a into which the axle 38 can be inserted, bolts or rings at opposite ends of the orifice 16a, or other conventional means for securing the axle 38 at its end points while still allowing the axle to rotate. The axle 38 is rotated in any known manner such as by gear mechanisms, electromagnetics, or the like that are known in the art.

The damper blades 32 and 34 are mounted on opposite sides of the axle 38, and in a 180 degree relationship to each other in a manner such that when the axle rotates, the damper blades rotate about the axis of the axle. In the configuration shown in FIG. 3, the blade damper 30 can rotate 90 degrees counterclockwise from a closed position to a fully open position. In the closed position, the damper blades 32 and 34 are flush against the wall 16 to prevent fluid from flowing between the region 12 and the region 14. As the damper 30 is rotated about the axis of the axle 38, an opening is created between the damper blades 32 and 34 and the orifice 16a to allow fluid flow between the regions.

FIG. 4 demonstrates the effect the extension ears 32a and 34a have on fluid flow through the boundary planes perpendicular to the axle 38. As the blade damper 30 rotates counter clockwise, the damper blades 32 and 34 leave contact with the wall 16 to create side openings 40a and 40b which are parallel to the axis of the axle 38 to allow fluid flow through the orifice 16a. As the blade damper 30 rotates counterclockwise, the extension ears 32a and 34a are in contact with the corresponding wall portions of the orifice 16a which are perpendicular to the axis of the axle 38 so as to prevent fluid flow or leakage through the boundary planes corresponding to the boundary planes within the orifice 16a that are perpendicular to the axis of the axle 38. Thus, as the damper assembly 30 is rotated counterclockwise, fluid is allowed to flow between the two regions 12 and 14 through the controlled openings 40a and 40b which are parallel to the axis of the axle 38, but not through boundary planes perpendicular to the axis of the axle. The extension ears 32a and 34a thus provide for near linear damper opening versus fluid flow characteristics.

Referring to FIG. 5 of the drawings, a blade damper 50 is shown which is placed within an orifice 60 between the two regions 12 and 14 for controlling fluid flow between the regions. In this embodiment, the damper assembly 50 rotates a full 360 degrees around the axis of an axle 52 and has damper blades 54 and 56 extending from the axle 52 and a pair of extension ears 58 at each end of each of the blades. As the blade damper 50 rotates about the axis of the axle 52, the damper blades 54 and 56 create an opening within the orifice 60 to allow fluid flow between the regions 12 and 14. However, the extension ears 58 are in contact with the boundary planes of the orifice 60 that are perpendicular to the axis of the axle 52, regardless of the degree of rotation of the damper blade 50. The extension ears 58 thereby prevent leakage of fluid over the ends of the damper blades 54 and 56 which are perpendicular to the axle 52.

It is understood that variations may be made in the present invention without departing from the spirit and scope of the invention. For example, a damper may contain extension ears that are thin and light weight or thick and strong depending on the environment in which they are used. In addition, the shape of the extension ears may vary corresponding to the degree to which the damper may be rotated and the shape of the boundary plane for which leakage is to be controlled. Moreover, the shape of the extension ears may vary with respect to each other if the axle of the blade damper is not mounted over the center of the orifice. Further, the extension ears may be affixed to a mount plate on the orifice rather than at the ends of the damper blades.

Although illustrative embodiments of the present invention have been shown and described, a latitude of modification, change and substitution is intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A damper blade assembly for controlling the flow of fluid between two regions separated by a partition having a rectangular opening extending therethrough for permitting said flow, said assembly comprising:
   at least one rectangular damper blade corresponding in size to said opening and having at least on leading edge and two side edges extending perpendicular to said leading edge;
   means for pivoting said damper blade about an axis spaced from said leading edge between a closed position in which said damper blade extends in said orifice to prevent said flow and an open position in which said leading edge and at least a portion of each of said side edges are spaced from the corresponding potions of said partition defining said orifice to permit said flow; and
   means extending from said side edges and perpendicular to said damper blade for preventing fluid flow through the spaces between said side edges and their respective partition portions, so that the relationship between said pivoting, and therefore the degree of opening of said damper blade, and the amount of fluid flow through said orifice is substantially linear.

2. The blade assembly of claim 1, wherein said means for pivoting said damper blade comprises an axle mounted for rotational movement on said partition.

3. The blade assembly of claim 2, wherein there are two damper blades pivotally disposed on diametrically opposed longitudinal portions of said axle.

4. The blade assembly of claim 1, wherein said means extending from said side edges comprise circular plates.

5. The blade assembly of claim 1, wherein said means extending from said side edges comprise quarter circle extension ears extending from opposite surfaces of said blade.

* * * * *

UNITED STATES PATENT AND TRADEMARK OFFICE
CERTIFICATE OF CORRECTION

PATENT NO. : 5,333,838

DATED : August 2, 1994

INVENTOR(S) : Juan A. Garcia-Mallol

It is certified that error appears in the above-indentified patent and that said Letters Patent is hereby corrected as shown below:

Col. 2, line 38, "FIG. i" should be --FIG. 1--.

Signed and Sealed this

Eighth Day of November, 1994

Attest:

BRUCE LEHMAN

*Attesting Officer*     *Commissioner of Patents and Trademarks*